(12) United States Patent
Nguyen

(10) Patent No.: US 6,832,214 B1
(45) Date of Patent: Dec. 14, 2004

(54) METHOD, SYSTEM, AND PROGRAM FOR CONVERTING CODE TO EXECUTABLE CODE USING NEURAL NETWORKS IMPLEMENTED IN A SOFTWARE PROGRAM

(75) Inventor: Chung T. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,704

(22) Filed: Dec. 7, 1999

(51) Int. Cl.[7] .............................. G06F 15/18; G06F 9/45
(52) U.S. Cl. .............................. 706/15; 706/27; 706/30; 717/137; 717/140; 717/148
(58) Field of Search .............................. 706/15, 27, 26, 706/20, 30; 717/139, 148, 138, 106, 108, 114, 116, 118, 136, 137, 140, 146, 147

(56) References Cited

U.S. PATENT DOCUMENTS

| | | | |
|---|---|---|---|
| 5,960,391 A | 9/1999 | Tateishi et al. | 704/232 |
| 6,070,140 A | 5/2000 | Tran | 704/275 |
| 6,092,039 A | 7/2000 | Zingher | 704/221 |

FOREIGN PATENT DOCUMENTS

| | | |
|---|---|---|
| GB | 2280288 | 1/1995 |

OTHER PUBLICATIONS

Carreira et al., "Building a Neural Computer: A Compiler and Simulator for Partial Recursive Functions Over Neural Networks", Technical Report DI–FCUL TR–98–8, Dec. 1998, Retrieved from the Internet: http://www.di.fc.ul.pt/biblioteca/tech–reports.*

Balkenius et al., "Efficient Implementation of Neural Networks in an Object Oriented Programming Environment", Proceedings Neuro Nimes '91, Fourth International Conference, 1991, pp. 733–736.*

Burke et al., "The Jalapeno Dynamic Optimizing Compiler for Java", Proceedings of the ACM 1999 Java Grande Conference, Jun. 1999, pp 129–141.*

Al–Marzooq et al., "Program Transformation in Massively Parallel Systems", Fourth Symposium on the Frontiers of Massively Parallel Computation, Oct. 1992, pp 498–501.*

Prechelt, L., "A Parallel Programming Model for Irregular Dynamic Neural Networks", Proceedings of the Third Working Conference on Massively Parallel Programming Models, Nov. 1997, pp 214–219.*

Newhall, "Performance Measurement of Interpreted, Just–in–time Compiled, and Dynamically Compiled Executions", University of Wisconsin–Madison dissertation, 1999, Retrieved from the Internet: http://www.cs.wisc.edu/paradyn/papers/newhall_thesis.p.*

Vellacott, "ANNECS: A Neural Network Compiler and Simulator", Joint Conference on Neural Networks, Jul. 1991, vol. 2.*

Ouali et al., "Silicon Compiler for Neuro–ASICs", 1990 IJCNN International Joint Conference on Neural Networks, Jun. 1990, vol. 2, pp. 557–561.*

(List continued on next page.)

Primary Examiner—Anthony Knight
Assistant Examiner—Kelvin Booker
(74) Attorney, Agent, or Firm—David W. Victor; Konrad Raynes & Victor LLP

(57) ABSTRACT

Disclosed is a system, method, and program for generating a compiler to map a code set to object code capable of being executed on an operating system platform. At least one neural network is trained to convert the code set to object code. The at least one trained neural network can then be used to convert the code set to the object code.

48 Claims, 5 Drawing Sheets

OTHER PUBLICATIONS

Nigri et al., "Silicon Compilation of Neural Networks", 5$^{th}$ Annual European Computer Conference, May 1991, pp. 541–546.*

Kunze et al., "The Neural Network Objects", Proceedings of the 5$^{th}$ AIHENP Workshop, 1996.*

UK Search Report in App. No. GB0028818.3, date of Search Dec. 17, 2001.

*Theoretical Computer Science* (Netherlands) vol. 141, No. 1–2, pp. 1–52, Apr. 1995, ISSN 0304–3975 "Fundamental Study: A neural compiler" by F Gruau, J Y Ratajszczak, G Wiber.

S. Haykin, "Neural Networks: A Comprehensive Foundation", Macmillan Publishing Co., 1994, Chap. 13.5–13.7, pp. 518–526.

T. Kohonen, "The Self-Organizing Map", pp. 74–89, reprinted from Proc. IEEE, vol. 78, No. 8, Sept. 1990, pp. 1464–1480.

D. Kramer, "The Java™ Platform", JavaSoft, May 1996, pp. iii–24.

F. Yellin, "The JIT Compiler API", Oct. 1996, pp. 1–23, [retrieved on Nov. 21, 1999]<URL: http://java.sun.com/docs/jit_interface.html>.

C. Stergiou, and D. Siganos, "Neural Networks", believed to be published in Surprise 96 Journal 1996–1997, <URL: http://www–dse.doc.ic.ac.uk/~nd/surprise_96/journal/vol4/cs11/report.html>.

C.T. Nguyen, et al., "Wavelet–based Hybrid Neurosystem for Feature Extractions, Characterizations and Signal Classifications", Proceedings of the 29$^{th}$ Asilomar Conference on Signals, Systems, and Computers (2–Volume Set), 1196 Institute of Electrical and Electronics Engineers, [Online], [retrieved Apr. 24, 2001]. Retrieved from the Internet <URL: http://computer.org/Proceedings/asilomar/7370/73700904abs.htm Nov. 1996.

C.T. Nguyen, et al., "Wavelet–based Hybrid Neurosystem for Feature Extractions, Characterizations and Signal Classifications", Naval Undersea Warfare Center Division Newport, Newport, Rhode Island 08241, pp. 904–908. Nov. 1996.

H. Szu, et al., "Wavelet Transforms and Neural Networks for Compression and Recognition", Neural Networks, vol. 9, No. 4, pp. 695–708, 1996.

Chen, Chun Hsien et al. "A Neural–Network Architecture for Syntax Analysis", Revised Oct. 5, 1998, IEEE Transactions on Neural Networks, vol. 10. No. 1, Jan. 1999, pp. 94–114.

Chen et al., A Neural–Network Architecture for Syntax Analysis, IEEE Transactions on Neural Networks, Jan. 1999, vol. 10, No. 1, pp. 94–114.*

Roska, T., Analogic CNN Computing: Architectural, Implementation, and Algorithmic Advances—A Review, 1998 Fifth IEEE International Workshop on Cellular Neural Networks and Their Applications, Apr. 1998, pp. 3–10.*

Hussain, T., Cellular Encoding: Review and Critique, Queens University, NEC Research Index, Jul. 1997, pp. 1–47.*

Gander et al., Java Neural Network Toolkit: User's Manual, 1996, Obtained from the Internet: http://www.hta–bi.bfh.ch/Projects/janet/download/distrib.pdf.*

* cited by examiner

METHOD, SYSTEM, AND PROGRAM FOR CONVERTING CODE TO EXECUTABLE CODE USING NEURAL NETWORKS IMPLEMENTED IN A SOFTWARE PROGRAM

CROSS-REFERENCE TO RELATED APPLICATIONS

This application is related to the following co-pending and commonly-assigned patent application Ser. No. 09/455,705 entitled "Method, System, and Program for Converting Code to Executable Code Using Neural Networks Implemented in a Very Large Scale Integration (VLSI) Integrated Circuit," which application was filed on the same date herewith and which application is incorporated herein by reference in its entirety.

BACKGROUND OF THE INVENTION

1. Field of the Invention

The present invention relates to a method, system, and program for using neural networks for converting code to executable code.

2. Description of the Related Art

The Java** Platform provides an added layer of execution between the underlying operating system and programs written in the Java computer language. The Java Platform converts Java source code (.Java files) to bytecodes (.class files), which are machine independent representations of a Java class. Thus, the same bytecodes would be created for all operating system platforms. The bytecodes are then inputted to a Java Virtual Machine program that converts the bytecodes to the object code in the native machine language of the operating system on which the Java Virtual Machine is installed. Thus, there is a platform-specific Java Virtual Machine program for each platform on which Java programs can execute.

The Java Virtual Machine typically includes two components, an Interpreter and a Just-In-Time (JIT) Compiler. The bytecodes are either interpreted by the Interpreter or turned into native machine code by the JIT Compiler. The native code may then be executed to run the Java program. The JIT Compiler is intended to generate code faster for certain methods that are called frequently. The JIT operates by searching for strings having a recognizable pattern in the bytecodes. The JIT provides a mapping of such recognizable strings of bytecodes to native code statements. The JIT compiler reuses copies of translated bytecodes to speed up the compilation process. In this way, the JIT Compiler can quickly convert recognizable segments of the byte code to native code.

FIG. 1 illustrates the prior art method for converting Java source code to executable native machine code through the use of the Java Interpreter and JIT Compiler.

There is a need in the art for further improvements for compiling Java bytecodes into native code that may be executed by the native operating system platform on which the Java Virtual Machine is running.

SUMMARY OF THE PREFERRED EMBODIMENTS

To overcome the limitations in the prior art described above, preferred embodiments disclose a system, method, and program for generating a compiler to map a code set to object code capable of being executed on an operating system platform. At least one neural network is trained to convert the code set to object code. The at least one trained neural network is then used to convert the code set to the object code.

In further embodiments, the code set comprises Java bytecode implementing a Java class.

In still further embodiments, the at least one neural network comprises a first level and second level neural networks. The first level neural networks are trained to convert the code set to a unique representation of the code set and the second level neural network is trained to convert the unique representation of the code set to the object code. After training, the first level neural networks are capable of being used to convert the code set to a unique representation of the code set and the second level neural network is capable of being used to convert the unique representation to the object code.

In yet further embodiments, the code set is parsed into a plurality of input vectors and each input vector is assigned to one of a plurality of first level neural networks. The first level networks are trained to convert the assigned input vector to an output vector. The combined output vectors from each first level neural network form a unique representation of the code set.

In preferred embodiments, the at least one neural network used to convert the code set to object code is implemented in a software program.

Preferred embodiments provide a mechanism for utilizing neural networks to provide a mapping from an input code set, such as Java bytecodes implementing a class, to native machine code. The preferred embodiments are especially useful for substantially reducing the time needed to compile Java bytecodes into native machine code. The preferred embodiments avoid having to interpret any portion of the bytecodes. Instead, neural networks are utilized to map Java bytecodes to native machine code in a manner that is substantially faster than current Java Virtual Machine implementations using Interpreters and JIT Compilers. The neural networks of the preferred embodiments further reduce compilation time by parallel processing the input bytecodes and by providing a mapping that avoids the need for time consuming interpretation operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
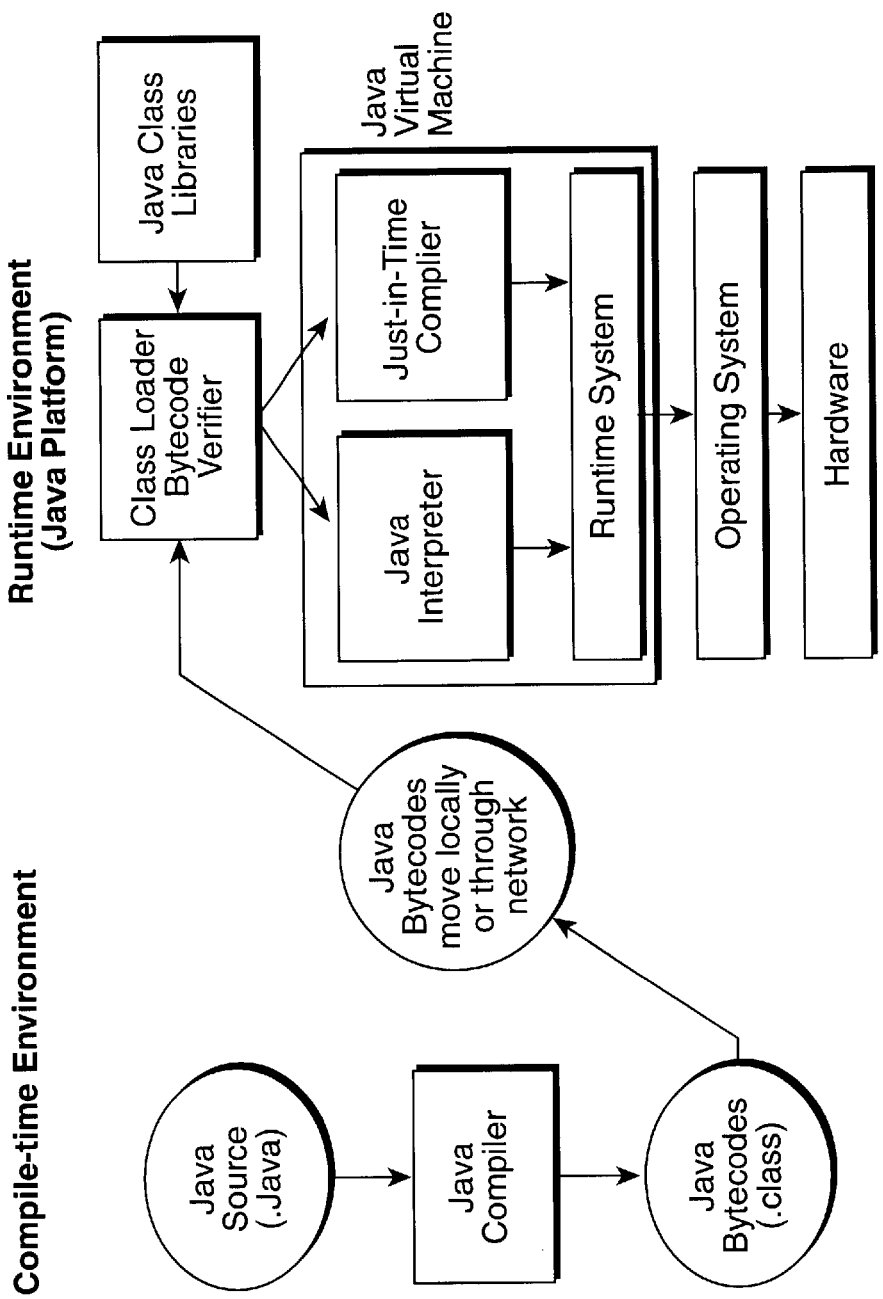
FIG. 1 is a block diagram illustrating a prior art process of converting Java source code to native machine code.
Figure 2:
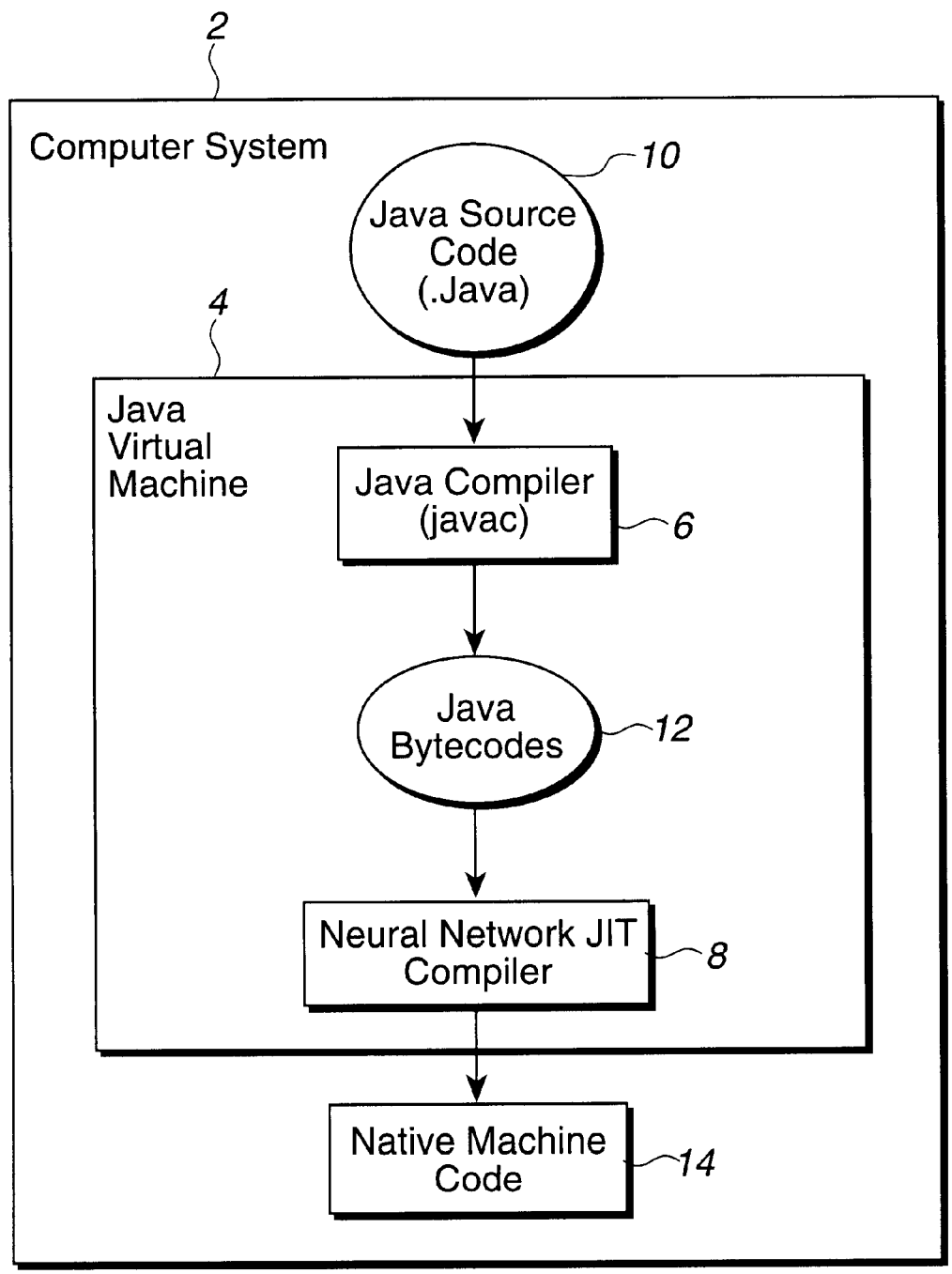
FIG. 2 is a block diagram illustrating the computing environment and components to convert source code to machine code in accordance with preferred embodiments of the present invention.

FIG. 2 depicts a computing environment including the components of the preferred embodiment Java Virtual Machine. A computer system 2 is comprised of any computer device known in the art, including personal computers, workstations, mainframes, network computers, etc., and includes an operating system known in the art, such as Solaris, Windows NT, AIX, etc.** The computer system 2 includes a Java Virtual Machine 4 that includes a Java Compiler 6 and Neural Network Just-In-Time (JIT) Compiler 8. The Java Compiler 6 receives the Java Source code 10 for a class, i.e., a Java file, and translates the source code to Java bytecodes 12 in a manner known in the art. Further details of the Java Compiler 6 and Java Virtual Machine 4 are described in the Sun Microsystems, Inc. publication "The Java Virtual Machine Specification," Second Edition (Copyright Sun Microsystems, Inc., 1996), which publication is incorporated herein by reference in its entirety, and available on the Internet at "http://java.sun.com/docs/books/vmspec/index.html". The Java bytecodes 12 are then provided as input to the Neural Network JIT 8, which converts the bytecodes into the native machine code 14, which is executable by the operating system of the computer system 2.

The bytecodes 12 provide all the information necessary to define a single Java class. The bytecodes 12 conform to the Java class file format. The Java class file format, implemented in the Java bytecode 12, defines the representation of a class or interface. The class file format components of the bytecodes 12 include:

Class Definition: includes access flags used to denote access permissions to the class, such as whether the class is private, public, an interface, abstract, etc.

Constant Pool: includes constant values used by the methods in the class.

Interface Implement: indicates classes that must interface with the class represented by the bytecode 12.

Field Table: captures properties and attributes of objects in the class, including access permissions to the object.

Method Table: List of methods of class to perform the tasks of the class.

Attribute Table: definition of attributes used with class definition, field table, and method table segments of bytecode.

The implementation of the six described categories of the bytecode 12 are further described in the publication "The Java Virtual Machine Specification," incorporated by reference in its entirety above.

Figure 3:
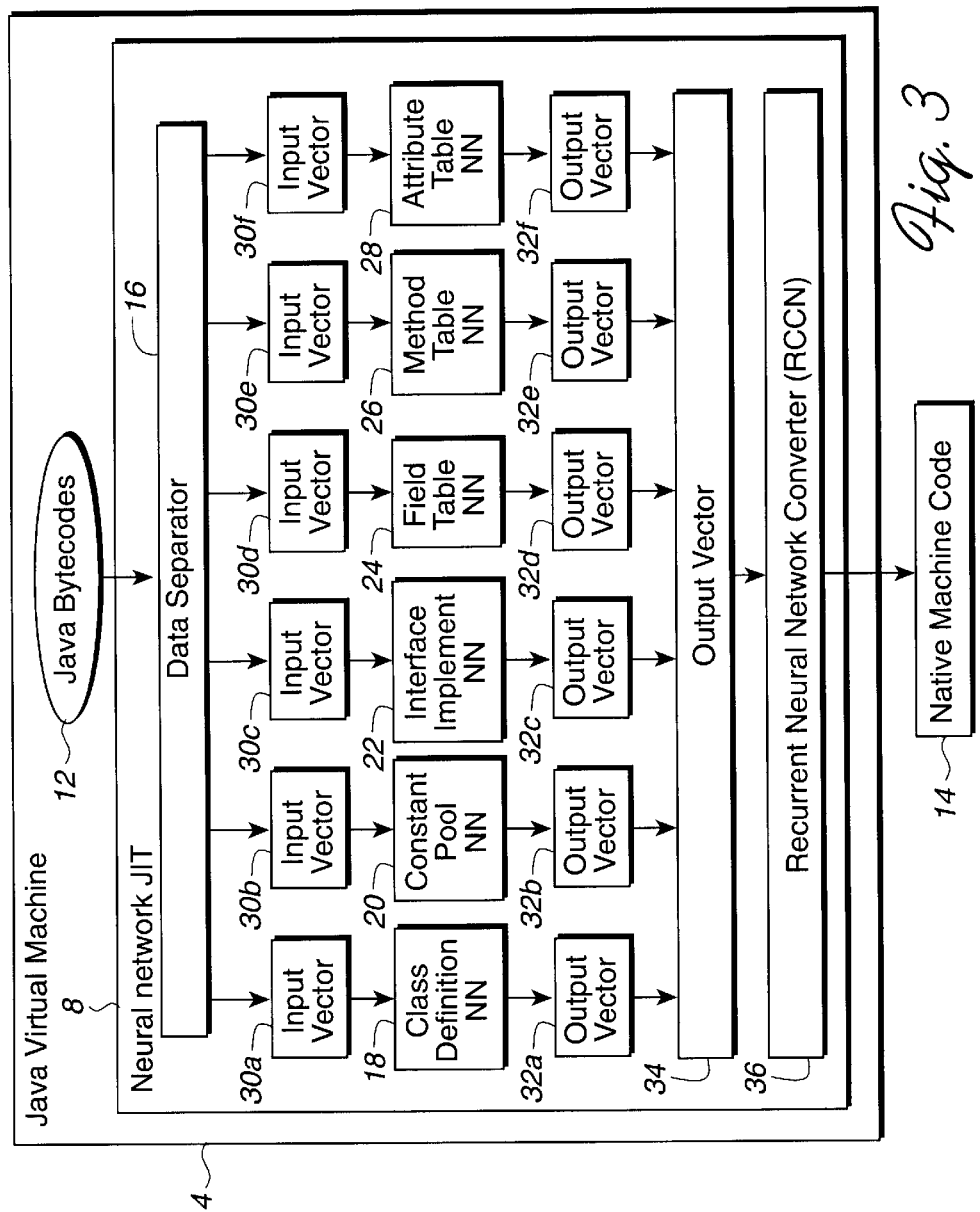
FIG. 3 illustrates the components of a Neural Network Just-In-Time (JIT) Compiler in accordance with preferred embodiments of the present invention.

FIG. 3 illustrates further detail of the components of the neural network JIT 8, which includes a data separator 16; six neural networks for each of the six above described class file format categories of the bytecode: a class definition neural network (NN) 18, a constant pool neural network, an interface implement neural network 22, a field table neural network 24, a method table neural network 26, and an attribute table neutral network 28; and a recurrent neural network converter (RNNC) 30. The data separator 16 parses the bits of the bytecode 12 into six different vectors 30a b, c, d, e, f, one for each of the six class categories of the bytecode 12. The bytecode 12 has a known format specifying the byte location of each of the class categories in the bytecode, which is described in the publication "The Java Virtual Machine Specification," incorporated by reference above. Each of these six class category vectors 30a, b, c, d, e, f are then inputted into the corresponding neural network 18, 20, 22, 24, 26, and 28 for that class, e.g., the class category input vector 30a comprising the class definition portion of the bytecode 12 is inputted to the class definition neural network 18, the input vector 30b comprising the constant pool portion of the bytecode 12 is inputted to the constant pool neural network 20, etc.

Figure 4:
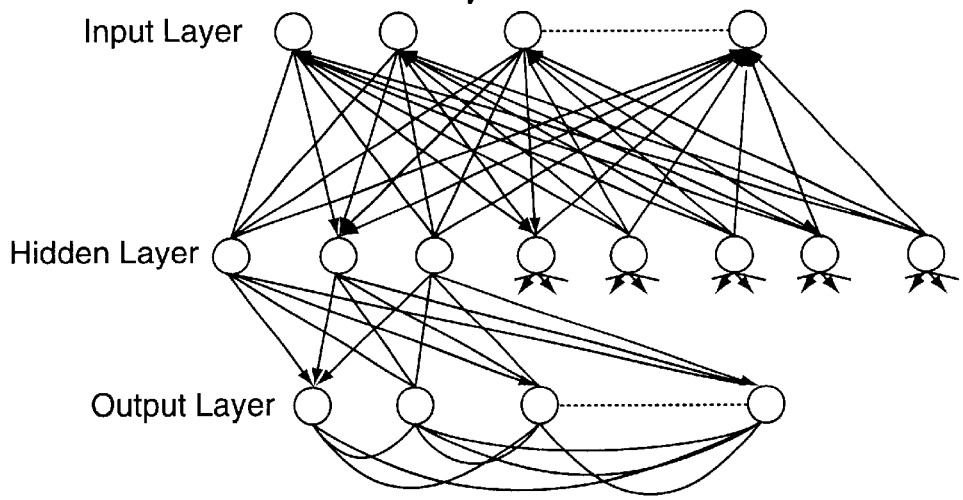
FIG. 4 illustrates an example of an implementation of the class category neural networks in accordance with preferred embodiments of the present invention.

In preferred embodiments, each of the class category neural networks 18, 20, 22, 24, 26, 28 comprises a separate neural network utilizing a self-organizing map neural network architecture known in the art, such as the self-organizing map neural network described in the IEEE publication "The Self-Organizing Map," by Teuvo Kohonen, IEEE, vol. 78, no. 9, pgs. 1464–1480 (Sept. 1990). FIG. 4 illustrates the self-organizing neural topology used for each of the class file format neural networks 18, 20, 22, 24, 26, 28. Each of the neural networks 18, 20, 22, 24, 26, and 28 includes an input layer 50 comprising one bit for each bit in the portion of the corresponding input vector 30a, b, c, d, e, f. For instance, each bit of the class definition input vector 30a would be inputted into nodes of the input layer for the class definition neural network 18. The data at the nodes of the input layer 50 are propagated through feedforward connections to nodes of the hidden layer 52. Each node in the hidden layer 52 is fully connected with the input layer 50, in that every input layer node 50 maps to each hidden layer node 52. Weights and adjustments are applied to the data from the input layer 50 nodes when mapping the input nodes to the hidden layer 52. The hidden layer 52 nodes propagate data through fully connected feedforward connections to the output layer 54 nodes. Weights and adjustments are applied to data propagated from the hidden layer 52 to the output layer 54. Lateral connections are constructed among the nodes of the output layer 54 to provide connection therebetween. The neural networks 18, 20, 22, 24, 26, and 28 convert the input nodes into a feature map of binary values or output vectors 32a, b, c, d, e, f. The concatenation of the output vectors 32a, b, c, d, e, f forms an output vector 34 that uniquely represents the class defined by the bytecode 12.

In preferred embodiments, the weights of the neural networks 18, 20, 22, 24, 26, and 28 are determined by training the nodes using a Self-Organizing Feature Mapping algorithm known in the art. The nodes are trained to produce output vectors 32a, b, c, d, e, f for the given input vectors 30a, b, c, d, e, f that when combined form output vector 24 as a unique representation of the class. The output vector 34 is fed into the Recurrent Neural Network Converter (RNNC) 36.

Figure 5:
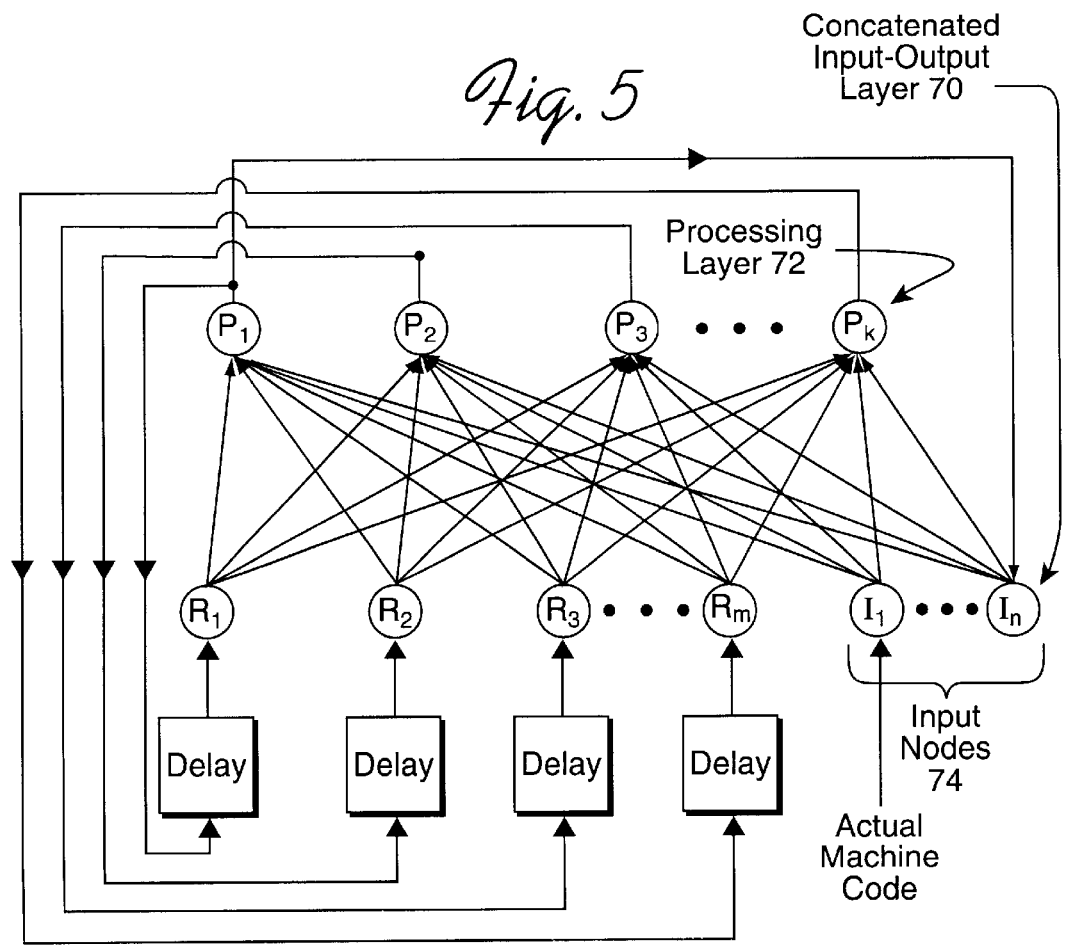
FIG. 5 illustrates an example of an implementation of the Recurrent Neural Network Converter (RNNC) in accordance with preferred embodiments of the present invention.

The RNNC 36 comprises a recurrent neural network structure known in the art, including feed back nodes. The RNNC 36 is trained through an iterative process, using standard recurrent neural network back-prolongation techniques, to convert the output vector from the neural networks 18, 20, 22, 24, 26, and 28 into the native machine code 14 for the input bytecode 12. Examples of back-propagation techniques that may be used to train the RNNC 36 are described in the publication "Neural Networks: A Comprehensive Foundation," by Simon Haykin, pgs. 519–526 (Macmillan Publishing Co., 1994) FIG. 5 illustrates an example of how the RNNC 36 may be implemented. The RNNC 36 includes a concatenated input-output layer 70 and a processing layer 72 including hidden and output neurons. The bits of the combined output vector 24 are placed at the input nodes 74, $I_l$ to $I_n$, of the RNNC 30. Thus, the bits in the output vector 36 are equal to the n input nodes 74, which in certain implementations may comprise 64 nodes. The concatenated input-output layer 70 further includes recurrent nodes $R_l$ to $R_m$ which receive feedback from all of the processing layer nodes 72 $P_l$ to $P_k$. In the implementation shown in FIG. 5, there are an equal number of n input nodes $I_l$ to $I_n$, processing layer 72 nodes $P_l$ to $P_k$, and recurrent nodes $R_l$ to $R_m$.

Weights are applied to map the data placed at the input nodes 74 $I_l$ to $I_n$ to the processing layer 72 nodes $P_l$ to $P_k$. Thus, the input nodes $I_l$ to $I_n$ are fully interconnected with the processing layer nodes $P_l$ to $P_k$. During training, the output from the processing layer 72 nodes is propagated as feedback to recurrent nodes $R_l$ to $R_m$ through time delay units $TD_l$ to $TD_m$ that delay the input to the recurrent nodes $R_l$ to $R_m$ by one time step.

Figure 6:
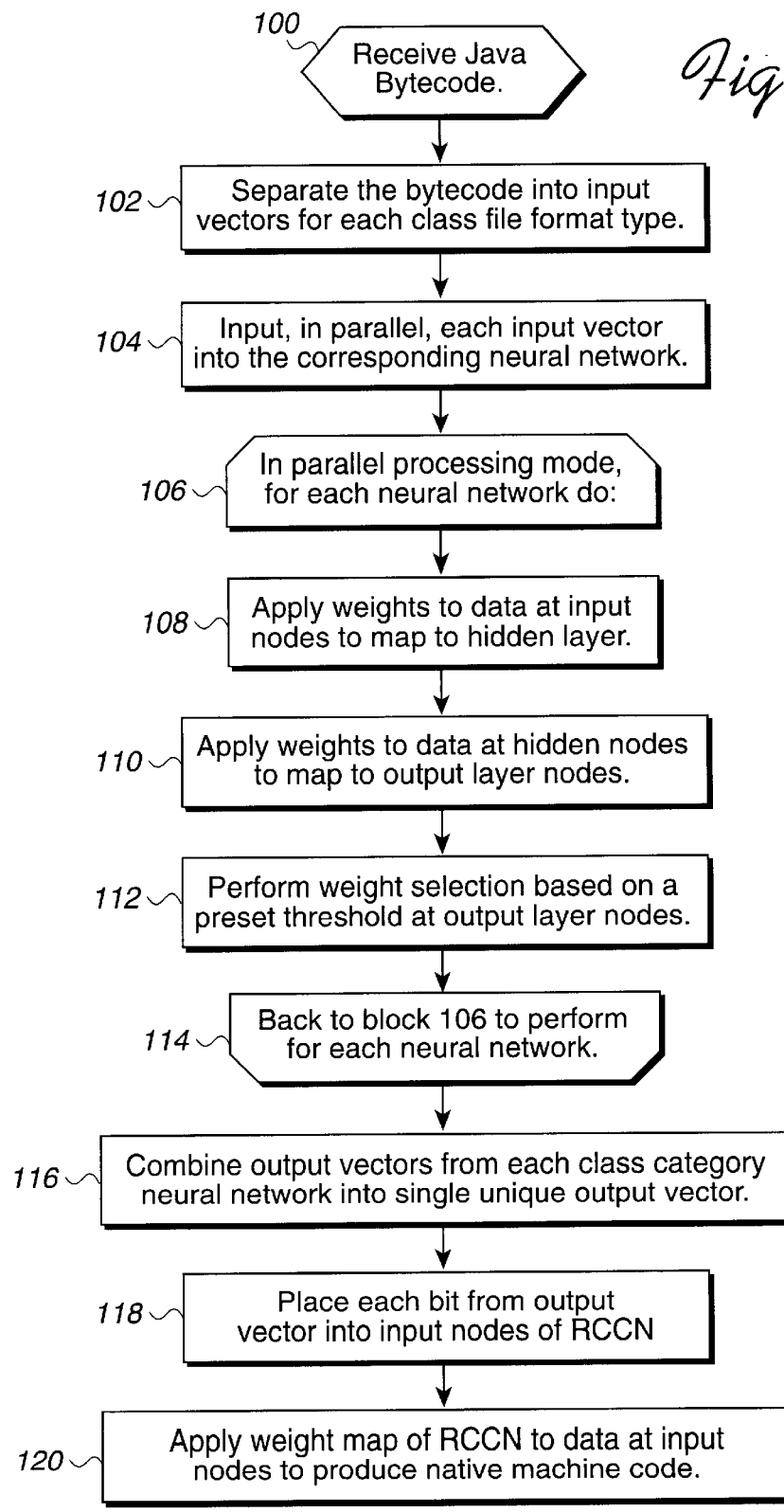
FIG. 6 illustrates logic implemented in the Neural Network JIT to convert Java bytecodes to native machine code in accordance with preferred embodiments of the present invention.

FIG. 6 illustrates the logic in accordance with the preferred embodiments to convert the Java bytecode 12 into native machine code 14. Control begins at block 100 with the Java Virtual Machine 4 receiving bytecode 12 implementing a Java class. The data separator 16 component of the Java Virtual Machine 4 parses the bytecode into separate input vectors 30a, b, c, d, e, f containing the bits of the bytecode 12 for each class category. The data separator 16 maintains predefined information on the bit locations of the different class file format types in the bytecode 12 to separate the bytecode into separate input vectors for each class file format type. These class category input vectors 30a, b, c, d, e, f would then be inputted (at block 104) into their respective neural networks 18, 20, 22, 24, 26, and 28, such that each bit of the input vectors would be placed at a node of the input layer of the corresponding class category neural network. The input vectors 30a, b, c, d, e, f may be entered into their class category neural networks 18, 20, 22, 24, 26, and 28, respectively, in parallel.

Block 106 represents the beginning of a parallel process for each class information neural network 18, 20, 22, 24, 26, 28 to map the input vectors 30a, b, c, d, e, f to output vectors 32a, b, c, d, e, f. For each neural network, predetermined weights are applied (at block 108) to map the data at the input nodes to the hidden layer and weights are then applied (at block 110) to map the data at the hidden layer nodes 52 to the output layer 54 nodes. The neural network 18, 20, 22, 24, 26, and 28 then selects (at block 112) weights based on a preset threshold, defined in the self-organizing map algorithm, for use at the output layer nodes. The Control proceeds (at block 114) back to block 106 if there are further neural networks 18, 20, 22, 24, 26, and 28 that need to process the bytecodes.

The output vectors 32a, b, c, d, e, f for each class category neural network 18, 20, 22, 24, 26, 28 are then combined (at block 116) to form an output vector 34 which provides a unique representation of the class formed by the bytecode 12. Each bit from the output vector 34 is then placed (at block 118) at one corresponding input layer 74 node $I_l$ to $I_n$ of the RNNC 36. The RNNC 36 then applies (at block 120) predetermined weights to map the output vector 34 to the native machine code 14.

In preferred embodiments, the weights used in the RNNC 36 would be determined by training the RNNC 36 to generate native machine code for a class based on the output vector 34 from the neural networks 18, 20, 22, 24, 26, 28 that provides a unique representation of the class. Numerous iterations are performed using the known output vector 34 from the neural networks 18, 20, 22, 24, 26, 28 and the target native machine code 14 to calculate and calibrate the recurrent weight matrix for the RNNC 36. The training procedure involves providing feedback to the recurrent nodes $R_l$ to $R_m$. This calculated weight matrix may then be applied to data from the nodes propagated between the concatenated input-output layer 70 and processing layer 72 to generate the native machine code 14.

The developer would have to train the class category neural networks 18, 20, 22, 24, 26, and 28 using self-organized map training techniques known in the art to generate a mapping that maps the bytecode 12 of a class to a binary unique representation of that class. The developer would further train the RNNC 36 using back-propagation training algorithms known in the art, utilizing feedback from the processing layer 72, to generate a mapping that would map the output vector 36 to the native machine code 14.

After generating the mappings for the neural networks, the Java virtual machine 4 may be implemented as software or in hardware logic on a VLSI chip. For software implementations, the java virtual machine code 4 would include the neural network weight mappings for each of the neural networks 18, 20, 22, 24, 26, 28, and 30 to map the data at the input nodes to the native machine code 14 using the logic of FIG. 6. In preferred embodiments, the neural networks may be implemented in the Just-In-Time compiler portion of the java virtual machine 4 to provide a quick mapping of the Java source code of a class to the native machine code 14. If new Java classes are added, then the developer will have to retrain the neural networks and generate new software including new neural network mappings based on the retraining to map the new class to native machine code. In such software implementations, the developer would have to provide program updates or fixes incorporating the mappings for new classes.

In VLSI implementations, the neural networks 18, 20, 22, 24, 26, 28, and 30 may be encoded in the integrated circuit. In such case, each node of the neural networks may be formed as a capacitor in the VLSI. The VLSI implementation of the neural networks 18, 20, 22, 24, 26, 28, and 30 may comprise a digital, analog or hybrid VLSI. Further, with a VLSI implementation, the weights and mappings of the neural networks 18, 20, 22, 24, 26, 28, and 30 may be trained as new Java classes are provided. Upon receiving a new Java class, the user can set the VLSI chip to learn mode to train the neural networks 18, 20, 22, 24, 26, 28 to produce a unique representation of the bytecode for the new Java class. The user would further set the VLSI chip to train the RNNC 36 to produce native machine code 14 from the output vector 34 from the class category neural networks 18, 20, 22, 24, 26, and 28. After training the VLSI chip to recognize new Java classes, the VLSI would be encoded to include the newly trained neural networks 18, 20, 22, 24, 26, 28, and 30 which can then be used to generate native machine code for the new Java class according to the logic of FIG. 6. In such embodiments, the VLSI could comprise a programmable chip, a filled programmable gate array (FPGA) or complex programmable logic device (CPLD). In this way, the VLSI logic would allow for the training and updating of the neural networks in the VLSI chip to map new bytecodes for new classes to native machine code. Alternatively, the neural networks may be implemented in non-programmable logic, such as application specific integrated circuits (ASICs), which are typically less expensive than the programmable logic devices.

Preferred embodiments utilize neural networks to compile Java code and map the input bytecodes to native machine codes without having to use the Interpreter.

Utilizing the neural networks reduces processing time because the Just-In-Time neural network of the preferred embodiments provides a quick mapping from bytecodes to native machine code and utilizes parallel processing techniques to further reduce processing time. Further, with VLSI implementations, the chip implementing the preferred embodiment neural network architecture may comprise programmable logic that is capable of being retrained to map bytecodes for new classes to the machine code for such new classes.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments described a method, system, and program for using neural networks to provide a just-in-time compilation of Java bytecodes. However, in alternative embodiments, the neural network architecture of the preferred embodiments may be used to compile the source or other intermediary code for computer languages other than Java and for classes implemented in object oriented computer languages other than Java.

Preferred embodiments provided specific architecture and node arrangements for the self-organizing neural networks 18, 20, 22, 24, 26, and 28 and the RNNC 36. However, those skilled in the art will appreciate that alternative node arrangement, including the use of more or fewer layers of nodes, may be used with the described neural network architecture.

Preferred embodiments were described with respect to the use of particular types of neural networks, such as self-organizing maps and recurrent neural networks. However, in alternative embodiments different types of neural networks other than those described herein may be used to perform the mappings from source or intermediary code to native machine code.

Preferred embodiments described the Java bytecode as separated into six class information related categories in order to provide input for the neural network mapping to the unique class representation. In alternative embodiments, the bytecode may be separated according to different characterizations of the bytecode, including characterizations unrelated to the Java class file format of the bytecode.

The class category neural networks 18, 20, 22, 24, 26, and 28 are described as implemented using separate neural networks and a self-organizing mapping technique. In alternative embodiments, the separate class category neural networks may be aggregated into fewer neural networks or multiplied into a greater number of neural networks. Further, the class category neural networks may utilize neural network architectures other than the self-organized mapping techniques.

Preferred embodiments were described with respect to converting intermediary Java bytecodes to object code. In further embodiments, the neural networks may be used to convert source code to object code or convert source code to an intermediary code form.

In summary, preferred embodiments disclose a method, system, and program for generating a compiler to map a code set to object code capable of being executed on an operating system platform. At least one neural network is trained to convert the code set to object code. The at least one trained neural network is then used to convert the code set to the object code.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS and MICROSOFT are registered trademarks of Microsoft Corporation; AIX is a registered trademark of IBM; JAVA is a trademark of Sun Microsystems, Inc.

What is claimed is:

1. A method for generating a compiler to map a code set to object code capable of being executed on an operating system platform, comprising:

training at least one neural network to convert the code set to object code, wherein the code set comprises an intermediary platform independent code generated by processing source code; and using the at least one trained neural network to convert the code set to object code.

2. The method of claim 1, wherein the code set comprises Java bytecode implementing a Java class.

3. The method of claim 1, wherein the code set represents an implementation of an object oriented class.

4. The method of claim 1, wherein training the at least one neural network comprises:

training at least one first level neural network to convert the code set to a unique representation of the code set; and training a second level neural network to convert the unique representation of the code set to the object code.

5. The method of claim 4, wherein training the at least one first level neural network comprises:

parsing the code set into a plurality of input vectors; and assigning each input vector to one of a plurality of first level neural networks, wherein each of the first level neural networks are trained to convert the assigned input vector to an output vector, wherein the combination of the output vectors from each first level neural network forms a unique representation of the code set.

6. The method of claim 5, wherein the code set comprises a Java bytecode implementing a Java class, and wherein parsing the code set into a plurality of input vectors, comprises parsing the code set into categories based on the bytecode class file format, wherein each input vector includes bits from the bytecode that comprise one of the categories.

7. The method of claim 5, wherein the second level neural network comprises a recurrent neural network, and wherein training the second level neural network comprises performing iterations inputting the unique representation of the code set to the second level neural network to generate the object code, wherein the generated object code is fed back into the second level neural network until the second level neural network is capable of mapping the unique representation of the code set to the object code with a minimal amount of error in the mapping.

8. The method of claim 5, wherein the first level neural networks comprise a self-organizing map neural network.

9. The method of claim 1, further comprising implementing the at least one neural network in a software program that is capable of mapping the input code set to the object code.

10. The method of claim 1, wherein the software program is implemented in a Java Just-In-Time Compiler component of a Java Virtual Machine.

11. The method of claim 1, wherein converting with the at least one neural network the received code set to the object code further comprises:

mapping, with each of a plurality of neural networks, a predefined section of the code set to an output vector;

combining the output vectors from the neural networks to form a combined output vector; and processing the combined output vector to produce the object code.

12. A method for mapping a code set to object code capable of being executed on an operating system platform, comprising:

receiving the code set with at least one neural network, wherein the code set comprises an intermediary platform independent code generated by processing source code; and converting with the at least one neural network the received code set to the object code.

13. The method of claim 12, wherein converting, with the at least one neural network, the code set to the object code comprises:

converting, with at least one first level neural network, the code set to a unique representation of the code set; and converting, with a second level neural network, the unique representation of the code set to the object code.

14. The method of claim 13, wherein converting the code set to the unique representation with the at least one first level neural network comprises:

parsing the code set into a plurality of input vectors;

assigning each input vector to one of a plurality of first level neural networks;

converting, with each of the first level neural networks, the assigned input vector to an output vector; and combining the output vectors from each first level neural network to form a unique representation of the code set.

15. The method of claim 12, wherein the code set comprises Java bytecode implementing a Java class and the at least one neural network is implemented in a Just-In-Time Compiler portion of a Java Virtual Machine.

16. A system for generating a compiler to map a code set to object code capable of being executed on an operating system platform, comprising:

means for training at least one neural network to convert the code set to object code, wherein the code set comprises an intermediary platform independent code generated by processing source code; and means for using the at least one trained neural network to convert the code set to object code.

17. The system of claim 16, wherein the code set comprises Java bytecode implementing a Java class.

18. The system of claim 16, wherein the code set represents an implementation of an object oriented class.

19. The system of claim 16, wherein the Means for training the at least one neural network comprises:

means for training at least one first level neural network to convert the code set to a unique representation of the code set; and means for training a second level neural network to convert the unique representation of the code set to the object code.

20. The system of claim 19, wherein the means for training the at least one first level neural network comprises:

means for parsing the code set into a plurality of input vectors; and means for assigning each input vector to one of a plurality of first level neural networks, wherein each of the first level neural networks are trained to convert the assigned input vector to an output vector, wherein the combination of the output vectors from each first level neural network forms a unique representation of the code set.

21. The system of claim 20, wherein the code set comprises a Java bytecode implementing a Java class, and wherein the means for parsing the code set into a plurality of input vectors, comprises parsing the code set into categories based on the bytecode class file format, wherein each input vector includes bits from the bytecode that comprise one of the categories.

22. The system of claim 21, wherein the second level neural network comprises a recurrent neural network, and wherein the means for training the second level neural network comprises means for performing iterations inputting the unique representation of tic code set to the second level neural network to generate the object code, wherein the generated object code is fed back into the second level neural network until the second level neural network is capable of mapping the unique representation of the code set to the object code with a minimal amount of error in the mapping.

23. The system of claim 19, wherein the first level neural networks comprise a self-organizing map neural network.

24. The system of claim 16, further comprising means for implementing the at least one neural network in a software program that is capable of mapping the input code set to the object code.

25. The system of claim 24, wherein the software program is implemented in a Java Just-In-Time Compiler component of a Java Virtual Machine.

26. A system for mapping a code set to object code capable of being executed on an operating system platform, comprising:

means for receiving the code set, wherein the code set comprises an intermediary platform independent code generated by processing source code; and neural network means for converting the code set to the object code.

27. The system of claim 26, wherein the neural network means further comprises:
- first level neural network means for converting the code set to a unique representation of the code set; and
- second level neural network means for converting the unique representation of the code set to the object code.

28. The system of claim 27, wherein the first level neural network means further comprising:
- means for parsing the code set into a plurality of input vectors; and means for assigning each input vector to one of a plurality of first level neural networks;
- means for converting the assigned input vector to an output vector; and
- means for combining the output vectors from each first level neural network to form a unique representation of the code set.

29. The system of claim 26, wherein the code set comprises Java bytecode implementing a Java class and the at least one neural network is implemented in a Just-In-Time Compiler portion of a Java Virtual Machine.

30. The system of claim 26, wherein the neural network means for converting the received code set to the object code further performs:
- mapping, with each of a plurality of neural networks, a predefined section of the code set to an output vector;
- combining the output vectors from the neural networks to form a combined output vector; and
- processing the combined output vector to produce the object code.

31. An article of manufacture for use in generating a compiler to map a code set to object code capable of being executed on an operating system platform, the article of manufacture comprising computer useable media accessible to a computer, wherein the computer usable media includes at least one computer program that is capable of causing the computer to perform:
- training at least one neural network to convert the code set to object code, wherein the code set comprises an intermediary platform independent code generated by processing source code; and
- using the at least one trained neural network to convert the code set to object code.

32. The article of manufacture of claim 31, wherein the code set comprises Java bytecode implementing a Java class.

33. The article of manufacture of claim 31, wherein the code set represents an implementation of an object oriented class.

34. The article of manufacture of claim 31, wherein training the at least one neural network comprises:
- training at least one first level neural network to convert the code set to a unique representation of the code set; and
- training a second level neural network to convert the unique representation of the code set to the object code.

35. The article of manufacture of claim 34, wherein training the at least one first level neural network comprises:
- parsing the code set into a plurality of input vectors; and
- assigning each input vector to one of a plurality of first level neural networks, wherein each of the first level neural networks are trained to convert the assigned input vector to an output vector, wherein the combination of the output vectors from each first level neural network forms a unique representation of the code set.

36. The article of manufacture of claim 35, wherein the code set comprises a Java bytecode implementing a Java class, and wherein parsing the code set into a plurality of input vectors, comprises parsing the code set into categories based on the bytecode class file format, wherein each input vector includes bits from the bytecode that comprise one of the categories.

37. The article of manufacture of claim 35, wherein the second level neural network comprises a recurrent neural network, and wherein mining the second level neural network comprises performing iterations inputting the unique representation of the code set to the second level neural network to generate the object code, wherein the generated object code is fed back into the second level neural network until the second level neural network is capable of mapping the unique representation of the code set to the object code with a minimal amount of error in the mapping.

38. The article of manufacture of claim 35, wherein the first level neural networks comprise a self-organizing map neural network.

39. The article of manufacture of claim 31, further comprising implementing the at least one neural network in a software program that is capable of mapping the input code set to the object code.

40. The article of manufacture of claim 31, wherein the software program is implemented in a Java Just-In-Time Compiler component of a Java Virtual Machine.

41. An article of manufacture for use in mapping a code set to object code capable of being executed on an operating system platform, the article of manufacture comprising computer useable media accessible to a computer, wherein the computer usable media includes at least one computer program that is capable of causing the computer to perform:
- using at least one neural network to convert the code set to the object code, wherein the code set comprises a intermediary platform independent code generated by processing source code; and
- converting with the at least one neural network the received code set to the object code.

42. The article of manufacture of claim 41, wherein converting, with the at least one neural network, the code set to the object code comprises:
- converting, with at least one first level neural network, the code set to a unique representation of the code set; and
- converting, with a second level neural network, the unique representation of the code set to the object code.

43. The article of manufacture of claim 42, wherein converting the code set to the unique representation with the at least one first level neural network comprises:
- parsing the code set into a plurality of input vectors;
- assigning each input vector to one of a plurality of first level neural networks;
- converting, with each of the first level neural networks, the assigned input vector to an output vector; and
- combining the output vectors from each first level neural network to form a unique representation of the code set.

44. The article of manufacture of claim 41, wherein the code set comprises Java bytecode implementing a Java class and the at least one neural network is implemented in a Just-In-Time Compiler portion of a Java Virtual Machine.

45. The article of manufacture of claim 41, wherein converting with the at least one neural network the received code set to the object code further comprises:
- mapping, with each of a plurality of neural networks, a predefined section of the code set to an output vector;
- combining the output vectors from the neural networks to form a combined output vector; and processing the combined output vector to produce the object code.

46. A method for generating a compiler to map a code set to object code capable of being executed on an operating system platform, comprising:

training at least one neural network to convert the code set to object code by training each of a plurality of neural networks to map a predefined section of the code set to an output vector, wherein the output vectors from the neural networks are combined to form a combined output vector that is further processed to produce the object code; and using the at least one trained neural network to convert the code set to object code.

47. A system for generating a compiler to map a code set to object code capable of being executed on an operating system platform, comprising:

means for training at least one neural network to convert the code set to object code by training each of a plurality of neural networks to map a predefined section of the code set to an output vector, wherein the output vectors from the neural networks are combined to form a combined output vector that is further processed to produce the object code; and means for using the at least one trained neural network to convert the code set to object code.

48. An article of manufacture for use in generating a compiler to map a a code set to object code capable of being executed on an operating system platform, the article of manufacture comprising computer useable media accessible to a computer, wherein the computer usable media includes at least one computer program that is capable of causing the computer to perform:

training at least one neutral network to convert the code set to object code by training each of a plurality of neural networks to map a predefined section of the code set to an output vector, wherein the output vectors from the neural networks are combined to form a combined output vector that is further processed to produce the object code; and using the at least one trained neural network to convert the code set to object code.

* * * * *

UNITED STATES PATENT AND TRADEMARK OFFICE
CERTIFICATE OF CORRECTION

PATENT NO. : 6,832,214 B1
APPLICATION NO. : 09/455704
DATED : December 14, 2004
INVENTOR(S) : Chung Tien Nguyen It is certified that error appears in the above-identified patent and that said Letters Patent is hereby corrected as shown below:

Column 10

Line 14, delete "Means" and insert -- means -- .
Line 44, delete "tie" and insert -- the -- .

Column 12

Line 8, delete "mining" and insert -- training -- .
Line 33, after "comprises", delete "a" and insert -- an -- .

Signed and Sealed this

Nineteenth Day of September, 2006

JON W. DUDAS
*Director of the United States Patent and Trademark Office*